US008043643B1

(12) United States Patent
Stevens et al.

(10) Patent No.: US 8,043,643 B1
(45) Date of Patent: Oct. 25, 2011

(54) COATED CEREAL PIECES

(75) Inventors: Cheree L. B. Stevens, Idaho Falls, ID (US); John F. Stevens, Idaho Falls, ID (US)

(73) Assignee: Advanced Food Technologies, Inc., Grand Rapids, MI (US)

( * ) Notice: Subject to any disclaimer, the term of this patent is extended or adjusted under 35 U.S.C. 154(b) by 578 days.

(21) Appl. No.: 11/932,765

(22) Filed: Oct. 31, 2007

Related U.S. Application Data

(63) Continuation of application No. 10/997,518, filed on Nov. 24, 2004, which is a continuation-in-part of application No. 10/170,964, filed on Jun. 13, 2002, now Pat. No. 7,294,355.

(60) Provisional application No. 60/525,036, filed on Nov. 25, 2003, provisional application No. 60/334,646, filed on Nov. 30, 2001, provisional application No. 60/305,505, filed on Jul. 16, 2001.

(51) Int. Cl.
*A23B 9/14* (2006.01)

(52) U.S. Cl. ........ 426/289; 426/292; 426/295; 426/618; 426/619; 426/620

(58) Field of Classification Search ........................ None
See application file for complete search history.

(56) References Cited

U.S. PATENT DOCUMENTS

| | | |
|---|---|---|
| 3,424,591 A | 1/1969 | Gold |
| 3,597,227 A | 8/1971 | Murray et al. |
| 3,630,755 A | 12/1971 | Schiffmann et al. |
| 3,723,132 A | 3/1973 | Hodge et al. |
| 3,751,268 A | 8/1973 | Van Patten et al. |
| 4,053,650 A | 10/1977 | Chino et al. |
| 4,066,796 A | 1/1978 | McKee |
| 4,109,024 A | 8/1978 | Cremer |
| 4,293,572 A | 10/1981 | Silva et al. |
| 4,504,502 A | 3/1985 | Earle et al. |
| 4,504,509 A | 3/1985 | Bell et al. |
| 4,510,166 A | 4/1985 | Lenchin et al. |
| 4,520,034 A | 5/1985 | Ishii et al. |
| 4,551,340 A | 11/1985 | El-Hag et al. |
| 4,603,054 A | 7/1986 | Schmidt et al. |
| 4,710,228 A | 12/1987 | Seaborne et al. |
| 4,790,997 A | 12/1988 | Friedman et al. |
| 4,792,458 A | 12/1988 | Friedman et al. |
| 4,828,847 A | 5/1989 | Thompson |
| 4,859,477 A * | 8/1989 | Augustine et al. ............ 426/103 |
| 4,913,919 A | 4/1990 | Cornwell et al. |
| 5,004,616 A | 4/1991 | Shanbhag et al. |
| 5,035,912 A | 7/1991 | Furcsik et al. |
| 5,059,435 A | 10/1991 | Sloan et al. |
| 5,120,562 A | 6/1992 | Furcsik et al. |
| 5,130,151 A | 7/1992 | Averbach |
| 5,141,759 A | 8/1992 | Sloan et al. |
| 5,204,137 A | 4/1993 | Slimak |
| 5,254,353 A | 10/1993 | Huang et al. |
| 5,260,076 A | 11/1993 | Furcsik et al. |
| 5,302,410 A | 4/1994 | Calder et al. |
| 5,393,552 A | 2/1995 | Busacker et al. |
| 5,431,944 A | 7/1995 | Melvej |
| 5,439,697 A | 8/1995 | Gonzalez-Sanz |
| 5,484,617 A | 1/1996 | Tiffany |
| 5,492,707 A | 2/1996 | Chalupa et al. |
| 5,622,741 A | 4/1997 | Stubbs et al. |
| 5,626,893 A | 5/1997 | Reddy |
| 5,648,110 A | 7/1997 | Wu et al. |
| 5,750,168 A | 5/1998 | Woerman et al. |
| 5,753,286 A | 5/1998 | Higgins |
| 5,849,351 A | 12/1998 | Higgins et al. |
| 5,885,639 A | 3/1999 | Judkins et al. |
| 5,897,898 A | 4/1999 | Rogols et al. |
| 5,922,392 A | 7/1999 | Kelly et al. |
| 5,928,693 A | 7/1999 | Friedman et al. |
| 5,965,189 A | 10/1999 | Stevens et al. |
| 5,976,607 A | 11/1999 | Higgins et al. |
| 5,988,048 A | 11/1999 | Hunter et al. |
| 5,997,918 A | 12/1999 | Melvej |
| 6,022,569 A | 2/2000 | Rogols et al. |
| 6,080,434 A | 6/2000 | Horn et al. |
| 6,086,928 A | 7/2000 | Stevens et al. |
| 6,113,957 A | 9/2000 | Mattinson et al. |
| 6,132,785 A | 10/2000 | Collinge et al. |
| 6,159,521 A | 12/2000 | Horn et al. |
| 6,197,363 B1 | 3/2001 | Walter, Jr. et al. |
| 6,217,921 B1 | 4/2001 | Lanner et al. |
| 6,265,005 B1 | 7/2001 | Haverkos et al. |

(Continued)

FOREIGN PATENT DOCUMENTS
CA             2101474          7/1993

(Continued)

OTHER PUBLICATIONS

84th AACC Annual Meeting Symposia and Reports, A. Jurgens, J.M. Maagd, and A.J. ten Dam, Oct. 31-Nov. 3, 1999.
Specialty-Corn Types, David V. Glover, Dept. of Agronomy, Purdue University, Oct. 1999.
Capolex B; Specialty Coatings for Snack Foods & Baked Goods, Centerchem, Inc., 1998.
Prior Art French Fry Batter Formula.
"Keeping the Crunch in Breakfast Cereals" by Kimberlee J. Burrington, Food Product Design Jun. 2001.
Fennema, Owen (ed.), Food Chemistry Third Edition, Marcel Dekker, Inc. 1996, pp. 201-204.

(Continued)

*Primary Examiner* — Lien Tran
(74) *Attorney, Agent, or Firm* — Price Heneveld LLP

(57) ABSTRACT

Cereal pieces at least partially coated with a composition typically containing a starch component, generally a wheat starch or a dextrin component, are provided. The coating composition provides the cereal pieces with enhanced resistance to breakage and superior ability to retain their texture and strength in milk or other liquids compared to traditional cereal pieces.

20 Claims, No Drawings

U.S. PATENT DOCUMENTS

| | | |
|---|---|---|
| 6,288,179 B1 | 9/2001 | Baur et al. |
| 6,635,294 B2 | 10/2003 | Keijbets |
| 6,733,809 B2 | 5/2004 | Zimmerman et al. |
| 6,896,915 B2 | 5/2005 | Shi et al. |
| 6,899,906 B2 | 5/2005 | Stevens et al. |
| 7,294,355 B2 | 11/2007 | Roskam et al. |
| 2002/0001643 A1 | 1/2002 | Stevens et al. |
| 2002/0058099 A1 | 5/2002 | Stevens et al. |
| 2002/0119219 A1 | 8/2002 | Doyle et al. |
| 2003/0044488 A1 | 3/2003 | Roskam et al. |
| 2004/0071832 A1 | 4/2004 | Stevens et al. |
| 2004/0096548 A1 | 5/2004 | Stevens et al. |
| 2004/0146630 A1 | 7/2004 | Roskam et al. |
| 2005/0079248 A1 | 4/2005 | Stevens et al. |
| 2005/0202136 A1 | 9/2005 | Stevens et al. |
| 2008/0050474 A1 | 2/2008 | Roskam et al. |
| 2009/0098255 A1 | 4/2009 | Stevens |
| 2009/0098256 A1 | 4/2009 | Stevens et al. |

FOREIGN PATENT DOCUMENTS

| | | |
|---|---|---|
| WO | 8501188 | 3/1985 |
| WO | 9421143 | 9/1994 |
| WO | 9600011 | 1/1996 |
| WO | 9742827 | 11/1997 |
| WO | 9746106 | 12/1997 |
| WO | 0028828 | 5/2000 |
| WO | 0065932 | 11/2000 |
| WO | 0069287 | 11/2000 |
| WO | 0156393 | 8/2001 |

OTHER PUBLICATIONS

Igoe, Robert. Dictionary of Food Ingredients, Springer-Verlag, 2001, p. 83.

LrdRas. Flour-msg; flour as thickener, Sep. 4-5, 1998, p. 12; http://www.florilegium.oro/files/FOOD-BREADS/flour-msg..html.

* cited by examiner

COATED CEREAL PIECES

CROSS-REFERENCE TO RELATED APPLICATIONS

This application is a continuation of U.S. patent application Ser. No. 10/997,518, filed Nov. 24, 2004, the disclosure of which is hereby incorporated by reference in its entirety. U.S. patent application Ser. No. 10/997,518, filed Nov. 24, 2004 claims priority to and the benefit of U.S. Provisional Application No. 60/525,036, filed Nov. 25, 2003, the disclosure of which is hereby incorporated by reference in its entirety.

U.S. patent application Ser. No. 10/997,518, filed Nov. 24, 2004, also claims priority to and is a continuation-in-part of U.S. patent application Ser. No. 10/170,964, filed Jun. 13, 2002 Now U.S. Pat. No. 7,294,355, which claims priority to and the benefit of U.S. Provisional Patent Application Ser. No. 60/334,646, filed Nov. 30, 2001, and U.S. Provisional Patent Application Ser. No. 60/305,505, filed Jul. 16, 2001.

BACKGROUND OF THE INVENTION

This invention generally relates to at least partially coated cereal pieces exhibiting superior breakage resistance and bowl life as compared to traditional uncoated cereal pieces.

Different types of edible food coatings are known including relatively heavy and thick coatings of various materials (e.g., bread crumbs, potato batter, tempura, etc.) as well as various flours or starch-based coatings that are usually applied as a relatively thin batter thereby forming a much thinner coating, which can be substantially transparent after application to the food substrate. The thinner coatings are then cooked, further cooked if parfried, or otherwise thermally processed. This latter type of coating is extensively used on commercially prepared french fry potatoes, where they are often referred to as "clear coats" due to their unobtrusive and, in some cases, virtually unnoticeable visual characteristic. However, clear coats formulated for french fry products do not typically adhere to wheat based substrates.

Applicants presently believe that cereal pieces have been known since about 1863. The first reported cereal pieces were derived from granulets and were eventually named granola.

Applicants presently believe that cereal pieces have been known since about 1863. The first reported cereal pieces were derived from granulets and were eventually named granola. The early cereal pieces consisted of heavy nuggets from bran and the outer husk of a grain that is removed when making flour. Later, in about 1906, W.K. Kellogg developed toasted cornflakes. In 1924, GENERAL MILLS® created the well-known WHEATIES® cereal. Later, GENERAL MILLS® began using the "puffing gun" to heat grains such as rice until they puffed up into crunchy spheres. It is believed the first "puffed" cereal to be marketed was named KIX® available from GENERAL MILLS®. After KIX® was marketed, a new process called shredding was used to make cereal pieces. This resulted in Shredded Wheat™ cereal. By the middle 1950s, cereal manufacturers began adding sugar to cereal pieces to sweeten the taste and to attract younger consumers.

Cereal pieces coated with sweeteners and color enhancers have been known for quite some time. However, traditional coated and uncoated cereal pieces are easily broken in processing, while packaged, or after dispensing. Whether the cereal pieces are used in breakfast cereal foods or snack mixes, past cereal pieces experience significant breakage during blending, packaging and distribution. Breakfast cereal foods and snack mixes are traditionally prepared by blending various cereal pieces, fruits, sweeteners, pretzels, croutons, crackers, nuts and the like. During this blending process, traditional cereal pieces frequently break resulting in multiple smaller "crumbs" of cereal pieces. These "crumbs" from the blending process are undesirable to the consumer and therefore are generally not packaged and distributed.

Also, traditional coated cereal pieces often experience significant breakage during distribution. At various stages of the distribution process, the cereal packages are handled causing traditional cereal pieces to break during handling to form more undesirable "crumbs," which are ultimately seen by the end consumer.

A consumer opening breakfast cereal or snack mixes containing traditional cereal pieces, usually discovers "crumbs" of cereal pieces and is generally dissatisfied. This dissatisfaction may result in poor customer loyalty to these products and may ultimately result in decreased sales.

Accordingly, there is a significant need for a substantially invisible composition that, when applied to the external surface of cereal pieces, imparts significantly enhanced durability to cereal pieces. Additionally, there is a significant need for inexpensive, easily produced, and easily distributed, significantly more desirable, coated cereal pieces having superior ability to retain its texture and strength in milk or other liquid while retaining the flavor and appearance similar to uncoated cereal pieces.

SUMMARY OF THE INVENTION

The present invention generally relates to cereal pieces at least partially coated with a composition typically containing a starch component, generally a wheat starch, and/or a dextrin component that provides the cereal pieces with enhanced resistance to breakage and superior ability to retain its texture and strength in milk or other liquid compared to traditional cereal pieces.

These and other features, advantages, and objects of the present invention will be further understood and appreciated by those skilled in the art by reference to the following specification and claims.

DETAILED DESCRIPTION OF PREFERRED EMBODIMENT

Cereal pieces are typically any variety of generally hard or crisp dry products that the consumer may purchase which are generally either packaged as a breakfast cereal product or included in a snack mix product. Cereal pieces typically are manufactured from one or more of a variety of raw materials including, but not limited to, wheat, rice, corn, oats or other kinds of grains or grain derivatives. Some other basic dry ingredients are flour (flours are typically used instead of whole grains for extruded gun-puffed cereals), starches, heat-stable vitamins, and minerals, sugar, salt, malt, flavors and colorants. Cereal piece shapes vary widely and include flakes, puffs, and any other variety of geometric shape including squares, such as a CHEX® cereal piece available from GENERAL MILLS® and hexagonal cereal pieces, such as a CRISPIX® cereal piece available from THE KELLOGG COMPANY®. Typical children's cereal pieces and other cereal pieces are produced in a variety of colors using one or more colorants and optionally using any number of sweeteners including, i.e., sucrose and high fructose corn syrup as coatings.

The compositions of the present invention are typically applied to the surface of cereal pieces in the form of a wet slurry or in the form of dry material followed by a water mist.

The coating compositions may cover at least a portion, and typically a substantial portion, if not the entirety of the cereal piece. Once applied to cereal pieces and subsequently dried onto the surface, the coating compositions provide enhanced resistance to breakage to the cereal pieces thereby increasing their strength as compared to uncoated cereal pieces. The composition also provides superior ability to retain its texture and strength in milk or other liquid, typically referred to as extended bowl life. The compositions are typically clear coating compositions and accordingly are substantially invisible (clear) if not totally invisible (clear) to the consumer. As such, the coating compositions will not detract from the appearance of the cereal pieces.

As discussed above, the coating compositions of the present invention may be applied as either a wet slurry or as a dry coating, which is thereafter hydrated. Typically, the coating compositions are applied as a dry coating and thereafter hydrated instead of being applied as a wet slurry because the high moisture content of the wet slurry can cause the starch in the finished cereal piece material to collapse onto itself causing the cereal piece substrate to shrink (increase in density). The dry coatings that are then hydrated with a minimal amount of water form the necessary coating/matrix on the substrate, but limit the amount of shrinkage (increase in starch density) of the cereal piece. In fact, the hydrated dry coating compositions are typically dried using, for example, a convection oven within twenty seconds or less after water is applied. This further limits the time the starch in the cereal piece is exposed to the water, thereby further limiting shrinkage (increase in starch density) of the cereal piece. The dry material coating compositions are generally applied to the surface of cereal pieces as a small dry particles (i.e., fine solid particles). The dry material coating composition of the present invention, when applied as dry material on previously thermally processed cereal pieces typically includes a dextrin component and a starch component, but while not typical, a dextrin alone may also be used.

The dextrin component increases the bowl life and the resistance to breakage of the coated cereal pieces. The dextrin may be any dextrin including corn dextrin, tapioca dextrin, or any other commercially available dextrin, however a medium to high or a high solubility tapioca dextrin is most typically utilized. While the dextrin can be used as the only ingredient in the coating composition, when used alone they tend to form a more glossy coating. Accordingly, in order to reduce the glossy look of the coating and improve mouth feel, as discussed below, the dextrin is typically about 60% of the dry material coating composition based on the weight of the composition.

The dextrin, typically the tapioca dextrin is generally a medium to high solubility dextrin, that exhibits at least about 70% solubility in cold water (about 77° F.). All dextrins are soluble to some degree; however, typically a medium to high solubility dextrin, more typically a high solubility dextrin is used in a dry coating composition. Using a high solubility dextrin allows the dextrin to readily solubilize when a small amount of water is applied after the dry coating composition has been applied to the cereal piece. Thus, the higher solubility facilitates formation of a coating with application of less water.

The term "low solubility dextrin" typically means less than 32% of the dextrin is soluble when placed in cold water (approximately 77° F.). Further, to one of ordinary skill in this art, the term "low solubility dextrin" also generally refers to the solubility of a dextrin when compared to other dextrins. For example, a medium solubility dextrin typically exhibits from about 32% to about 90% solubility when placed in cold water (approximately 77° F.) and a high solubility dextrin typically exhibits about 90% or more solubility when placed in cold water (approximately 77° F.). A dextrin having a solubility at 70% or greater is considered a medium to high solubility dextrin.

The wet slurry coating composition of the present invention also typically utilizes a dextrin. However, the dextrin used for wet slurry coatings may be a low, medium or high solubility dextrin, or any combination of these dextrins because the wet slurry is heated to a high enough temperature (i.e., 155° F.) to gelatinize the dextrin. Gelatinized dextrin is typically clear in appearance and aids in the crispness of the coating. Because the dextrins in wet slurry applications have typically been heated, and therefore gelatinized, one can apply a wet slurry coating composition that includes these dextrins at any temperature including either a warm temperature (i.e., 155° F.) or a cool temperature (i.e., room temperature).

The dry material coating composition of this embodiment also typically includes a starch component. A crosslinked potato starch, an oxidized corn starch and/or an acetylated potato, corn or wheat starch, or any combination of any of these starches are typically utilized. The starch component is typically used at about 40% by weight of the dry material coating composition. The starch component tenderizes the coated cereal piece. That is to say, the starch component in the dry material coating composition reduces the shine making the cereal piece look more like a traditional cereal piece and improves the texture and mouth feel of the coating without compromising the resistance to breakage and bowl life of the coated cereal pieces. Crosslinked potato starches are particularly useful in this embodiment. One oxidized corn starch useful in this embodiment of the present invention includes BATTER BIND® S, available from National Starch and Chemical Company of Bridgewater, N.J. Also, any acetylated potato starch, acetylated corn starch and/or acetylated wheat starch is also suitable for use in the present invention.

When applying the dry material composition to the thermally processed cereal pieces, any industrially acceptable application process may be utilized, including, but not limited to, spraying and tumbling. The tumbling application process is typically preferred. In the tumbling application process the dry material coating composition is placed in a tumbler along with the cereal pieces to be coated. To Applicants' knowledge, any type of tumbler is acceptable. The dry material coating composition is then tumbled with the cereal pieces to form coated cereal pieces. The dry material coating composition may be any size, but is typically 100 mesh or smaller particles because the smaller particles more readily hydrate and form the coating when water is applied. As a result, the smaller particles are also less likely to be visible after drying.

As discussed above, once the coated cereal pieces are formed, a minimal amount of water is applied to the coated cereal pieces. Only enough water to hydrate the dry material coating composition is needed. Any water application process is acceptable, however a spraying application process is typically preferred. As soon as possible, typically within 20 seconds after the coated cereal pieces have been sprayed with water, they are transferred to a dryer. This transfer process is done quickly to limit the amount of time that the water can interact with the starch that makes up the cereal pieces. As discussed above, the longer water is in contact with the starch of the cereal piece there is greater collapse of the starches in the cereal piece resulting in shrinkage and increased product density. The quicker this transfer takes place, the less overall density change there is to the coated cereal piece. Typically, the coated cereal pieces are at least partially dried. The cereal pieces coated with the dry material composition have a final moisture level that is substantially similar to the original moisture level of uncoated cereal pieces. Processing techniques for thermally processing (i.e., drying) the coated cereal pieces include, but are not limited to, frying, baking and microwaving, but most typically includes baking the coated cereal pieces in a convection oven or other similar device.

Additionally, it is presently believed that the coating composition of the present invention may be applied to the exterior of formed, but as yet unthermally processed or partially thermally processed cereal pieces. Moreover, it is presently believed that the coating compositions of the present invention may also be incorporated in the cereal pieces dough matrix prior to formation of the cereal piece from the matrix to provide some amount of improved resistance to breakage and improved bowl life. Such cereal doughs may be thermally processed and a coating of the present invention is also applied. While this is an option, Applicants presently believe that applying the coating composition to the surface thermally processed of cereal pieces offers the advantage that significantly less amounts of coating composition is required as compared with the amount of coating composition required if the composition is incorporated into the dough matrix. Moreover, Applicants presently believe the application of the coating composition to the exterior of the cereal pieces significantly improves resistance to breakage and bowl life because the exterior coating typically provides at least substantially continuous coating on the surface of the cereal piece. As a result, the resistance to breakage is improved as well as the bowl life.

The coating compositions of the present invention, when applied to the external surface of cereal pieces, result in cereal pieces that are more durable and less prone to breakage than uncoated cereal pieces. Breakage testing indicates that significant more force is required to break the coated cereal pieces relative to the uncoated control cereal pieces. Cereal pieces coated with the coating compositions of the present invention are approximately three times more resistant to breakage than traditional cereal pieces. The increased resistance to breakage helps prevent breakage during storage and transport.

Additionally, cereal pieces coated with the coating of the present invention, that are then placed in contact with milk or other fluid(s), experience an extended bowl life when compared to traditional cereal pieces. Bowl life is the time a cereal piece can remain in contact with milk or other fluid(s) and still maintain its crispness, i.e., a person can still feel and/or hear the cereal crunch in the mouth when it is consumed. Coated cereal pieces according to the present invention typically absorb at least about 20% less milk or other fluid(s) over a given time period than traditional cereal pieces. Surprisingly, not only do the coated cereal pieces of the present invention typically allow for less milk to be absorbed by the cereal piece, but have also been shown to extend bowl life while absorbing the same amount or more milk than a traditional cereal piece. This is believed to be a result of the exterior coating which maintains its integrity in liquid for a longer period of time thereby giving the consumer the feel of crispness even though the cereal piece may have absorbed an amount of fluid that would have softened an uncoated cereal piece. The coated cereal pieces of the present invention have been found to have a bowl life (the ability of the cereal piece to remain crisp—a consumer can hear and/or feel the cereal crispness when consuming the cereal) of about nine to about 12 minutes. By contrast, traditional uncoated cereal pieces have a bowl life of about two minutes, which has generally been accepted by the cereal industry. The absorption of milk or other fluid(s) by cereal pieces tends to result in cereal pieces that rapidly lose their shape, crispness, texture and taste.

Various other optional ingredients such as a colorant(s) or sweeteners(s) may be added to the coating composition, but are generally not desired and, therefore, a colorant is not typically included in the formulas of the present invention. If a colorant is used, any water dispersible food colorant or combination of food colorants may be used, including caramel.

The following examples more precisely and particularly illustrate the specific details of the present invention. Equivalent procedures and quantities will occur to those skilled in the art and, therefore, the following examples are not meant to define the limits of the present invention, these being defined by the scope of the appended claims. These embodiments are applied to cereal pieces as described in the Examples. The object of the following examples was to prepare a coating composition in a laboratory environment, wherein the coating composition, when applied to the external surfaces of cereal pieces, was not visible but provides more resistance to breakage and longer bowl life than uncoated cereal pieces, imparts durability, and preserves the flavor and appearance similar to uncoated cereal pieces.

Wet Slurry Coating Compositions for Cereal Pieces

Examples 1-4

Example 1

Coating Composition Primarily Including a Modified Starch

The coating composition of the present invention most typically utilized when the coating composition is applied as a slurry on thermally processed cereal pieces typically includes a modified starch. The modified starch may include any modified starch, including, but not limited to, wheat starch, corn starch, potato starch, rice starch, or combinations of any of these, etc., however, modified wheat starch is most typically used. The modified starch is typically applied to the external surface of cereal pieces in an amount of about 100% by weight of the coating composition. When the present embodiment contains less than about 100% modified starch, the additional additives may include known fillers and/or water. The modified starch is primarily used to provide film-formation; however, starch also provides viscosity and crispness. The coating composition including wheat starch generally adheres well to the external surface of the cereal pieces.

When a modified wheat starch is utilized and applied to the external surface of the cereal pieces, the typical solids content of the modified wheat starch containing coating composition may be from about 0.5% to about 80% by weight of the coating composition, more typically from about 10% to about 50%, and most typically at about 35%. The percentage of dry pickup of the slurry coating composition on the cereal pieces of this embodiment of the present invention generally is from about 2% to about 30%, more typically from about 5% to about 10%, and most typically at about 6%-7%. The percentage pickup measures the amount of dry solids of slurry coating composition that does not fall off the cereal pieces after application. The percentage pickup is typically determined via the following calculation: the weight of the coated cereal pieces minus the weight of the uncoated cereal pieces. This weight is then multiplied by the percentage of wet batter solids. This amount is then divided by the uncoated weight and multiplied by 100. The slurry coating composition is typically applied to the external surface of the cereal pieces at a temperature of from about 35° F. to about 212° F., more typically from about 35° F. to about 110° F. or from about 60° F. to about 180° F., and most typically at about 155° F. Applicants have surprisingly found that by applying the wet slurry coating compositions of the present invention to cereal pieces at the above temperatures increases cereal rigidity, crispness of the cereal pieces, and results in the coated cereal pieces having an increased bowl life while assuring that the coating composition remains at least substantially invisible.

The modified wheat starch can be modified, either physically or chemically, by any industrially acceptable modification means, including, but not limited to, crosslinking, oxidizing, and/or substitution. When a substituted wheat starch is utilized, the typical substitution level of the modified wheat starch ranges from about 0.01% to about 1%, more typically about 0.1%. MIDSOL 35™, which may be purchased from Midwest Grain Products of Atchison, Kans., is an oxidized and substituted (acetylated) wheat starch having such a substitution level that is most typically utilized as the modified starch of the coating composition. When utilized, the oxidized and acetylated wheat starch forms a film that will not shrink during the drying process or when dry. The oxidized and acetylated wheat starch also adheres well to cereal pieces because it is a wheat starch and typically cereal pieces contain wheat and/or oat components.

Example 2

Coating Composition Including a Wheat Starch and Other Ingredients

In another embodiment of the present invention, the coating composition includes a starch component, a film-forming agent (a dextrin component), a leavening system, a sweetener, and a stabilizer. The starch component is typically a wheat starch, more typically an oxidized and acetylated wheat starch as discussed above. Wheat starch is used to provide viscosity, crispness and film-formation. The wheat starch also generally increases the adhesion of the coating to the external surface of the cereal pieces. The wheat starch component may be a modified wheat starch such as an oxidized and substituted wheat starch. Typically, the wheat, starch used in the coating composition applied to the external surface of cereal pieces has been modified. The modified wheat starch is typically substituted within the ranges from about 0.01% to about 1%; however, the more typical substitution level is about 0.1%.

The coating composition of this example also typically includes a dextrin. The dextrin utilized may include corn dextrin, tapioca dextrin, potato dextrin, or other commercially available food dextrin known to those of skill in the art; however, corn dextrin is most typically used. The corn dextrin is believed to provide superior film-forming functionality to the coating composition as well as crispness and resistance to breakage. While any corn dextrin may be used, C*DRYSET 07702 corn dextrin available from Cargill of Minneapolis, Minn. is most typically used. C*DRYSET 07702 is a low-solubility corn dextrin that when it is heated to about 155° F. it gelatinizes and then becomes visibly clear. Another advantage to C*DRYSET 07702 is that it can be applied at any temperature.

The coating composition according to this embodiment may also contain a leavening system, usually a two-component, acid/base system. The leavening system typically utilizes an acid in combination with a bicarbonate salt. Typically, the sodium acid pyrophosphate (SAPP) or other acid is present in the range of from about 0% to about 5%, more typically from about 0.5% to about 2.5%, and most typically at about 1.8%. The bicarbonate salt typically includes sodium bicarbonate within the range of from about 0% to about 5%, more typically from about 0.5% to about 2.5%, and most typically at about 1.24%. Any sodium bicarbonate or SAPP may be used in the present invention. The sodium acid pyrophosphate, in combination with sodium bicarbonate, provides chemical leavening that results in a light tender texture and increases the crispness of the exterior of the cereal pieces.

The coating composition according to this embodiment of the present invention may also include sugar or other sweetening agent(s). When sugar is used as the sweetener, it is typically added as a solute to control starch hydration from film formation. In appropriate amounts, sugar imparts a sweet flavor, if desired. The sugar of the coating composition may be present from about 0% to about 30%, more typically from about 10% to about 20%, and most typically at about 14%.

Additionally, the coating composition of this embodiment may include a gum(s) or similar stabilizer(s), including, but not limited to, xanthan gum, guar gum, CMC (carboxymethylcellulose), locust bean gum or mixtures thereof. More typically, the coating composition includes a xanthan gum. The stabilizer(s) may be present in the coating composition in the amount of from about 0% to about 3%, more typically from about 0.5% to about 1%, and most typically at about 0.15%. The stabilizers are typically used in the wet slurry coating composition to keep particulate ingredients in suspension.

Typically, the coating composition temperature as applied to the external surface of cereal pieces for this embodiment is from about 40° F. to about 120° F., more typically from about 55° F. to about 85° F., and most typically at about 70° F. The slurry solids content percentage is typically from about 5.0% to about 70.0%, more typically from about 30.0% to about 55.0%, and most typically at about 46.0%. The percentage pickup of the coating composition is typically from about 5% to about 30%, more typically from about 8% to about 20%, and most typically at about 11% pickup.

Example 3

Coating Composition Including a Dextrin, a Corn Starch, and Other Ingredients

Yet another embodiment of the present invention includes a coating composition utilizing the combination of a dextrin, a modified corn starch, a sweetener, a color developing agent (dextrose), and a flow agent such as monocalcium phosphate. It is presently believed that the dextrin component may be any dextrin including corn dextrin, tapioca dextrin or any other commercially available dextrin; however, in this composition tapioca dextrin is most typically used because it provides better finished product properties than other dextrins. The dextrin component, typically a tapioca dextrin, is usually present at greater than 50% based on the weight of the composition, more typically from about 80% to about 100%, and most typically at about 99%. One tapioca dextrin useful in this embodiment of the invention is NATIONAL K4484™, available from National Starch and Chemical Co. of Bridgewater, N.J.

This embodiment of the present invention also typically includes a modified corn starch. The corn starch may be modified by an industrially acceptable means; however oxidization is the most typical modification. The oxidized corn starch is typically present in the coating composition at about 0.50% based on the weight of the composition. The oxidized corn starch is typically included in the composition as an adhesive component. An oxidized corn starch suitable for use in the present embodiment of the invention is BATTER BIND® S available from National Starch and Chemical Co. of Bridgewater, N.J.

The coating composition may also include an artificial or natural sweetener. The preferred sweetener is a sucrose sweetener such as powdered sugar. When used, the sugar is present in the coating composition at about 0.3% based on the weight of the composition.

The coating composition according to this embodiment may also include dextrose and monocalcium phosphate. When used, the dextrose, which aids in the color development of the coating composition is generally present in a coating composition at about 0.18% based on the weight of the composition. It is advantageous to use a color developer to match the color of the coating composition to the color of the cereal piece. Monocalcium phosphate is a flow agent to facilitate the handling of the coating composition. When used, the monocalcium phosphate or other flow agent is usually present in the composition at about 0.02% based on the weight of the composition.

Example 4

Coating Composition Including a Modified Food Starch, a Crispness Enhancer, a Dextrin, and Other Ingredients Yet another embodiment of a coating composition according to the present invention includes a coating composition that typically utilizes a combination of a modified food starch, a crispness enhancer, a dextrin, various flavor enhancers, a viscosity increasing agent and fillers. In this embodiment, the modified food starch component is typically a potato starch. The potato starch component may be a modified potato starch such as an oxidized, substituted, and/or crosslinked potato starch. The potato starch most typically used in the coating composition applied to the external surface of the cereal pieces is an ungelatinized and crosslinked potato starch.

The modified (chemically or physically) potato starch is typically present in the coating composition in an amount of from about 10% to about 80%, more typically from about 20% to about 70%, and most typically at about 64.82%. The modified potato starch primarily provides crispness to the coated composition. It is presently believed that any starch may be utilized in the coating composition of the present invention including corn starch, potato starch, tapioca starch, wheat starch or a mixture thereof, but potato starch is preferred.

Additionally, the coating composition of the present invention typically includes a flour or other crispness enhancer(s). The flour utilized may include wheat flour, rice flour, corn flour, potato flour, or any other commercially acceptable flour; however, rice flour is most typically used. The flour is believed to provide film-forming functionality and crispness to the coating composition. The flour of the coating composition is typically present in the amount of from about 1% to about 40%, 10% to about 30%, and most typically at about 19.03%. Rice flour is typically utilized because it works synergistically with the dextrin to enhance crispness and film formation.

The coating composition also typically includes a dextrin. The dextrin utilized may include a corn dextrin, a tapioca dextrin, a potato dextrin, any other commercially acceptable dextrin or mixtures thereof; however, corn dextrin is most typically used in this embodiment. This coating composition of the present invention may include corn dextrin in an amount of from about 1% to about 30%, more typically from about 5% to about 20%, and most typically about 10%.

Flavor enhancers incorporated into the present invention may include sugar, salt, mixtures thereof or other flavor enhancers. Typically, salt and sugar are included as flavor enhancers in this coating composition. Salt is generally included in an amount of from about 1% to about 5%, more typically at about 2% to about 4%, and most typically at about 3.75%. Sugar is typically included in this embodiment in an amount of from about 0.5% to about 5%, more typically from about 1% to about 4%, and most typically at about 2%. Both the salt and sugar may be purchased from any known salt or sugar manufacturer and/or distributor.

This composition of the present invention may also include a viscosity enhancer(s) or other stabilizers. The viscosity enhancer(s) and similar stabilizers include, but are not limited to, xanthan gum, guar gum, CMC (carboxymethylcellulose) or mixtures thereof. More typically, the coating composition includes a xanthan gum. The viscosity enhancer(s) may be present in the coating composition in the amount of from about 0% to about 3%, more typically from about 0.5% to about 1%, and most typically at about 0.15%.

The coating composition may also include additional fillers. Fillers suitable for use in the present invention include, but are not limited to, corn syrup solids. Corn syrup solids are generally present in this composition in an amount of from about 0.1% to about 5%, more typically from about 0.2% to about 2%, and most typically at about 0.25%. Corn syrup solids or other fillers suitable for use in the present invention may be purchased from any known supplier of food product fillers.

Wet Slurry Coating Compositions for Cereal Pieces

Examples 5-10

In coating composition examples 5-10, typically about 100% of the coating composition includes a starch (or mixtures of starches), any variety of dextrins that may further be chemically or physically modified, or a combination thereof. Known fillers and/or water generally make up the remainder of the coating compositions.

Example 5

Coating Composition Including Pregelatinized Wheat Starch

This embodiment of the present invention includes a pregelatinized wheat starch and optionally known fillers and/or water. The pregelatinized wheat starch of the present embodiment may be a modified or unmodified pregelatinized wheat starch. However, an unmodified, pregelatinized wheat starch is typically utilized. Typically, the coating compositions employing pregelatinized wheat starch as the primarily component have a pickup of from about 1% to about 40%, more typically from about 5% to about 35%, and most typically from about 8% to about 25%. One such unmodified, pregelatinized wheat starch suitable for this embodiment of the present invention is PREGEL #10™, which is available from Midwest Grain Products of Atchison, Kans.

Example 6

Coating Composition Including Modified Corn Starch

Yet another embodiment of the coating composition of the present invention includes a coating composition containing a modified corn starch and optionally known fillers and/or water. Typically, the corn starch may be modified (chemically or physically) by any industrially acceptable modification means, including, but not limited to, crosslinking, oxidation, acetylation and/or substitution. Such modified corn starches are typically high amylose corn starches. Typically, high amylose corn starches are those corn starches generally having 35% or greater amylose content. Coating compositions employing modified high amylose corn starch as the primary component typically have a pickup percentage of from about 1% to about 20%, more typically from about 5% to about 15%, and most typically about 9.5%. One such acetylated high amylose corn starch suitable for use in this embodiment of the present invention is CRISP FILM®, which is available from National Starch and Chemical Co. of Bridgewater, N.J.

Example 7

Coating Composition Including a Blend of Corn Starch and Dextrin

Another composition of the present invention includes a coating composition containing a blend of corn starch and dextrin. Optionally, known fillers and/or water may also be included in the coating composition. The corn starch is typically a high amylose corn starch. The dextrin in such a blend may be any dextrin, including, but not limited to, a tapioca dextrin, a corn dextrin, a rice dextrin, a wheat dextrin, or mixture thereof, however, tapioca dextrin is most typically used and is generally preferred. One blend of a high amylose corn starch and tapioca dextrin suitable for use in the coating composition of this embodiment of the present invention includes CRISP COAT UC™, which is available from National Starch and Chemical Co. of Bridgewater, N.J. This blend includes approximately 60% by weight high amylose corn starch and approximately 40% tapioca dextrin. When a blend of a high amylose corn starch and tapioca dextrin is utilized in the coating composition of this embodiment, the coating composition has a pickup of from about 1% to about 30%, more typically from about 5% to about 25%, and most typically about 8.9%.

Example 8

Coating Composition Including Dextrin

Yet another embodiment of the present invention includes a coating composition containing dextrin and optionally known fillers and/or water. The dextrin is typically a low-solubility dextrin. The dextrin may be any dextrin including, but not limited to, a tapioca dextrin, a corn dextrin, a wheat dextrin, a rice dextrin, or mixtures thereof, however, tapioca dextrin is preferred. A tapioca dextrin suitable for use in this embodiment of the coating composition of the present invention is NATIONAL 0280™, which is available from National Starch and Chemical Co. of Bridgewater, N.J. When NATIONAL 0280™ is utilized in the coating composition of this embodiment, the coating composition has a pickup of from about 1% to about 30%, more typically from about 5% to about 25%, and most typically about 9.7%.

Example 9

Coating Composition Including Unmodified Corn Starch

Another embodiment of the present invention includes a coating composition containing an unmodified corn starch and optionally known fillers and/or water. An unmodified high amylose corn starch suitable for use in this embodiment of the present invention is HYLON® VII, available from National Starch and Chemical Co. of Bridgewater, N.J. This unmodified corn starch is typically a high amylose corn starch containing at least approximately 70% amylose. When an unmodified high amylose corn starch is utilized in the coating composition of this embodiment, the coating composition typically has a pickup of from about 1% to about 30%, more typically from about 5% to about 25%, and most typically at about 11.4%.

Example 10

Coating Composition Including Acetylated Modified Wheat Starch

Yet another embodiment of the present invention includes a coating composition containing an modified (typically by acetylation) wheat starch and optionally known fillers and/or water. Typically, the wheat starch may be modified (chemically or physically) by any industrially acceptable modification means, including, but not limited to, crosslinking and/or substitution. Typically, acetylated modified wheat starch is utilized. It contributes crispness and viscosity to the coating composition of the present invention. An acetylated modified wheat starch suitable for use in this embodiment of the present invention is M500™, which is available from MGP Ingredients, of Atchison, Kans. When an acetylated modified wheat starch is utilized in the coating composition of this embodiment, the coating composition typically has a pickup of from about 1% to about 50%, more typically from about 5% to about 45%, and most typically at about 6.9%.

Example 11

Coating Composition Including a Wheat Starch and at Least One Modified Corn Starch Another embodiment of the present invention includes a coating composition containing: a wheat starch, typically a modified wheat starch; a modified high amylose corn starch component; and a modified crispness enhancer. The starch component is typically a modified wheat starch. Wheat starch is used to provide viscosity, crispness and film-formation. The wheat starch also improves the adhesion of the coating to the external surface of the cereal pieces. The wheat starch component is typically a modified wheat starch, most typically an oxidized and substituted wheat starch. The modified wheat starch is typically substituted within the ranges of from about 0.01% to about 1%; however, the more typical substitution level is about 0.1%. One modified wheat starch useful in the coating composition of the present invention is MID-SOL 35™ (an oxidized and substituted (by acetylation) wheat starch), which may be purchased from Midwest Grain Products of Atchison, Kans.

The coating composition of this Example also typically includes a modified high amylose corn starch. Generally, high amylose corn starches are those corn starches generally having 35% or greater amylose content. Coating compositions employing modified high amylose corn starch as the primary component. One such modified high amylose corn starch suitable for use in this embodiment of the present invention is CRISP FILM®, which is available from National Starch and Chemical Co. of Bridgewater, N.J.

The coating composition of this Example also typically includes a crispness enhancer. One such crispness enhancer suitable for use in this embodiment of the present invention includes a starch-based crisping agent, typically an acetylated corn starch.

The process for applying the coating composition of any of the previously discussed embodiments of the present invention (Examples 1-11) to the surface of a cereal piece may be achieved by any known method for applying a slurry coating composition to a substrate including, but not limited to, spray coating, dunk/drip bath, or by a waterfall application process.

The wet slurry coating compositions of the present invention are typically applied to the external surface of the cereal pieces after the cereal pieces have been formed by traditional processes, but can be applied to the surface of the formed cereal pieces prior to thermally processing the formed cereal pieces. In the typical process, after the cereal pieces have been at least partially coated, but typically substantially coated, with the slurry coating composition, the coated cereal pieces are thermally processed and subsequently dried.

In one coating method, traditionally finished, previously thermally processed cereal pieces are placed in a tumbler, a cylindrical rotating drum that essentially tumbles ingredients together and/or coatings onto substrates. The tumbler is usually set on a low speed (i.e. slow). A fine spray of the slurry coating composition is then applied onto the tumbling cereal pieces. After stopping the tumbler, the coated cereal pieces are transferred to a wire rack or tray, are thermally processed, subsequently dried if necessary to remove the added slurry moisture, and packaged either alone or with other food pieces for distribution.

The following is a more detailed discussion of some techniques some of the previously discussed coating compositions can be applied.

Application Process for the Coating Compositions of Examples 1 and 8

The object of these examples was to prepare cereal pieces according to the present invention in a laboratory environment. Coatings produced according to Examples 1 and 8 above are discussed in Table 1 below. The ingredients utilized in the coating composition in this application process include a modified wheat starch, specifically MIDSOL 35™ (Coating Composition-Example 1), a tapioca dextrin, specifically NATIONAL 0280™ (Coating Composition-Example 8), and a combination of a modified wheat starch and a tapioca dextrin (50/50 blend of Coating Composition-Example 1 and Coating Composition-Example 8). Each of the three coating compositions were mixed with water to make slurries having 20% solids concentration. The slurries were added to a one gallon garden sprayer, the garden sprayer was pressurized and the nozzle was adjusted to the finest spray possible. It is also possible to use an electric pressure sprayer with higher percent wet batter solids to enable one to apply less total slurry weight and achieve similar dry solids on the cereal pieces.

Approximately 150 gm of CHEX® cereal pieces were weighed and placed inside a tumbler. The tumbler was set on the lowest speed possible. The tumbler was started and subsequently the slurry coating composition was sprayed onto the tumbling pieces. The tumbler was then stopped, the coated cereal pieces were measured and recorded. The coated cereal pieces were transferred onto a wire rack or tray and placed in a dryer convection oven at approximately 250° F. (the temperature of the dryer for the coated cereal pieces is typically from about 150° F. to about 400° F., more typically from about 200° F. to about 300° F., and most typically 250° F.). The coated cereal pieces were then dried. The drying time of the coated cereal pieces typically ranged from about 1 minute to about 20 minutes, more typically from about 4 minutes to about 8 minutes, and most typically about 6 minutes.

TABLE 1

| Coating | Dry Weight | Target Coating Application | Actual Coating Application | % Dry Solid(s) Pickup |
|---|---|---|---|---|
| Modified wheat starch (Example 1) | 150 | 35 | 41.5 | 5.5 |
| | 150 | 50 | 59 | 7.9 |
| | 150 | 75 | 81 | 10.8 |
| | 150 | 100 | 115 | 15.3 |
| Tapioca dextrin (Example 8) | 100 | 25 | 29 | 5.8 |
| | 100 | 50 | 56 | 11.2 |
| | 100 | 75 | 81 | 16.2 |
| Combination of modified wheat starch and tapioca dextrin (50/50 blend) | 100 | 25 | 32 | 6.4 |
| | 100 | 50 | 52 | 10.4 |
| | 100 | 75 | 75 | 15.0 |

The modified wheat starch applied to the cereal pieces was nearly invisible and is the preferred coating composition. However, the tapioca dextrin coating composition is also suitable for use in the present invention, but may result in cereal pieces that are slightly tacky/sticky and have slight tooth packing when chewed.

Application of the Coating Compositions of Examples 1 and 3

The same application process as utilized immediately above was used herein and the dry weight, wet weight and percent of dry solids pickup measured. Table 2 below shows the dry weight of approximately 150 grams of CHEX® cereal pieces, the wet weight of the slurry coated cereal pieces and the percentage pickup of the wet slurry by the cereal pieces. Each of the coating composition formulas were mixed at 20% solids.

TABLE 2

| Coating | Dry wt. | Wet wt. | % Dry Solid(s) Pickup |
|---|---|---|---|
| Example 1 Coating Composition Product | 155 | 197 | 5.4 |
| Example 1 Coating Composition Product | 153 | 200 | 6.1 |
| Example 1 Coating Composition Product | 153 | 196 | 5.6 |
| Example 1 Coating Composition Product-Average | 153.7 | 197.6 | 5.7 |
| Example 3 Coating Composition Product | 154 | 185 | 4.0 |
| Example 3 Coating Composition Product | 155 | 189 | 4.4 |
| Example 3 Coating Composition Product | 152 | 188 | 4.7 |
| Example 3 Coating Composition Product-Average | 153.7 | 187.3 | 4.4 |

Both formulas resulted in a nearly invisible coating when applied to the cereal pieces.

Application Process for the Coating Compositions of Examples 1 and 5-10

The coating composition of Examples 1 and 5-10 were applied using the same laboratory environment application technique described under the subheading Application Process for the Coating Compositions of Examples 1 and 8. Similar to Table 2 above, Table 3 shows dry weight, wet weight, and the percent solids pickup for cereal pieces. Table 3 shows the dry weight of approximately 30 grams of cereal pieces, the wet weight of the slurry coated CHEX® cereal pieces, and the percentage pickup of the wet slurry by the cereal pieces.

TABLE 3

| Coating | Dry wt. | Wet wt. | % Dry Solid(s) Pickup |
|---|---|---|---|
| Example 1 Coating Composition Product | 31.5 | 49.0 | 11.1 |
| Example 5 Coating Composition Product | 32.5 | 68 | 21.9 |
| Example 5 Coating Composition Product | 29.5 | 42.5 | 8.8 |
| Example 5 Coating Composition Product-Average | 31 | 55.25 | 15.35 |
| Example 6 Coating Composition Product | 31.5 | 46.5 | 9.5 |
| Example 7 Coating Composition Product | 30.5 | 44 | 8.9 |
| Example 8 Coating Composition Product | 30.0 | 44.5 | 9.7 |
| Example 9 Coating Composition Product | 32.5 | 51.0 | 11.4 |
| Example 10 Coating Composition Product | 32.0 | 43 | 6.9 |

With the exception of the coating composition product of Example 1, all products showed some slight white dusting. The degree of dusting appears to be proportional to the percentage of pickup. The coating composition product of Example 1 is a light tan color so it is nearly invisible on the cereal pieces.

The following crush test data for the coating compositions of Examples 1 and 5-10 follows. The Cereal/Snack Piece Crush Test used for testing the increased resistance to breakage of the coated cereal pieces is described below:

Equipment
Digital balance (i.e. SARTORIUS® QS 16000B)
SANFORD® Super SHARPIE® Series No. 33000, Black
Method
1. Place cereal/snack piece horizontally on the balance platform.
2. Tare balance.
3. Pickup SHARPIE® or other force applying member or device and align vertically with the gray end in contact with the center of the cereal/snack pieces.
4. Watch the digital display as you slowly apply downward pressure with the SHARPIE®.
5. Note and record the highest weight (force) in grams on the display before the cereal/snack pieces shatters.
6. Clean debris from balance platform.
7. Repeat procedure with at least ten coated cereal pieces.
8. Report average and range for the recorded values.

Generally, the cereal pieces coated with the modified wheat starch slurry coating composition were substantially more resistant to breakage than either the cereal pieces coated with the tapioca dextrin or the blend of modified wheat starch and the tapioca dextrin coating compositions, but all provided some improved resistance to breakage.

Table 4 shows the grams shown on the digital scale at the time the cereal piece first broke when force was applied as discussed above regarding the Cereal/Snack Piece Crush Test. In particular, the table shows the grams displayed when cereal pieces coated with the control formula and cereal pieces coated with coating composition products of Examples 5-6 broke.

TABLE 4

| Control (uncoated) | The Coating Composition Product of Example 1 | The Coating Composition Product of Example 5 | The Coating Composition Product of Example 6 |
|---|---|---|---|
| 210 | 680 | 495 | 480 |
| 140 | 590 | 380 | 620 |
| 260 | 680 | 350 | 460 |
| 320 | 650 | 525 | 460 |
| 330 | 930 | 390 | 600 |
| 240 | 480 | 460 | 400 |
|  | 500 | 420 | 390 |
|  | 860 | 390 | 500 |
|  | 650 |  |  |
|  | 530 |  |  |
|  | 650 |  |  |
|  | 690 |  |  |

As shown below, in Table 5, the matrix makeup of the coating composition and the dry solid(s) pickup percentage both effect the resistance to breakage of the cereal pieces. The coating compositions of Examples 1, 5 and 6 each contain different coating ingredients. This demonstrates that coated cereal pieces require greater force to crush/break them than required to crush/break the uncoated cereal pieces. Table 5 shows the average grams shown on the digital scale at the time the cereal pieces first broke, as taken from Table 4. Table 5 also shows the average dry solid(s) pickup percentage for the coating compositions of Examples 1 and 5-6.

TABLE 5

|  | Control | Example 1 | Example 5 | Example 6 |
|---|---|---|---|---|
| Average | 250 | 658 | 410 | 456 |
| Percent Dry Solid(s) Pickup | 0 | 11.1 | 6.9 | 2.2 |

Dry Pickup % = [(grams of solution applied × % wet batter solids of solution)/original weight of cereal pieces] × 100

Table 6 shows the grams measured at the time the cereal pieces first broke according to the Cereal/Snack Piece Crush Test when the cereal pieces were coated with the coating composition products of Examples 7-10.

TABLE 6

| The Coating Composition Product of Example 7 | The Coating Composition Product of Example 8 | The Coating Composition Product of Example 9 | The Coating Composition Product of Example 10 |
|---|---|---|---|
| 480 | 560 | 440 | 400 |
| 590 | 400 | 550 | 450 |
| 590 | 560 | 340 | 410 |
| 400 | 540 | 700 | 230 |
| 750 | 740 | 730 | 640 |
| 740 | 640 | 520 | 680 |
| 670 | 740 | 650 | 540 |
| 550 | 640 | 570 | 380 |
| 650 |  | 420 | 260 |
|  |  |  | 280 |

Table 7 shows the average grams shown on the scale at the time the cereal pieces first broke according to the Cereal/Snack Piece Crush Test (see Table 6). Table 7 also shows the average pickup percentage for the coating compositions of Examples 7-10 shown in Table 6.

TABLE 7

|  | Example 7 | Example 8 | Example 9 | Example 10 |
|---|---|---|---|---|
| Average grams measured at the time the cereal pieces first broke | 489 | 602 | 603 | 547 |
| Percent Dry Solid(s) Pickup | 9.5 | 8.85 | 9.7 | 11.4 |

Dry Pickup % = [(grams of solution applied × % wbs of solution)/original weight of cereal pieces] × 100

Based on the crush test data and appearance, the coating composition product of Example 1 showed the best results. The coating composition products of Examples 7 and 8 showed good resistance to breakage and the remaining coating composition products of Examples 5-6 and 9-10 are also acceptable for use in the present invention. As demonstrated by Tables 5 and 7, the average force applied to the coated cereal piece is from about 1.64 to about 2.63 times the average force applied to an uncoated version of the cereal piece as measured using the Cereal/Snack Piece Crust Test.

The following example demonstrates some of the properties of the extended bowl life achieved by coating cereal pieces with the coating composition of the present invention.

A reduced moisture pickup and prolonged crispness was achieved when CHEX® cereal pieces were coated with the coating of the present invention and placed in bowls of 2% low fat milk. This Example demonstrates coated CHEERIOS® cereal pieces also exhibit reduced moisture pickup and prolonged crispness.

Coating Compositions Containing Modified Wheat Starch At 20% and 35% Wet Batter Solids A slurry of modified wheat starch at 35% wet batter solids content and water was prepared. The slurry was added to a power sprayer. A convection oven was preheated to a temperature of 250° F. on low fan speed. Subsequently, greater than 100 grams of toasted whole grain oat cereal pieces were placed in a stock pot and weighed. The toasted whole grain oat cereal pieces were then sprayed for 3-4 seconds with the slurry from the power sprayer. The cereal pieces were then tossed by hand and sprayed again for about 3-4 seconds. Again, the cereal pieces were tossed by hand. This process was continued until a preferred coating composition weight on the cereal pieces was achieved. This preferred coating composition weight on the cereal pieces is equivalent to a dry coating material weight range of from about 1% by weight to 15% by weight, however about 7% by weight is preferred. Once the desired degree of coating coverage is obtained, the weight of the wet slurry coated cereal pieces was measured and recorded. The cereal pieces were placed onto a wire rack and the wire rack was transferred to a convection oven. The cereal pieces were dried for 6 minutes. A control test was also prepared where the cereal pieces were sprayed with water only and subsequently dried.

The pickup percentage of the coating composition by the cereal pieces was measured and recorded. The wet and dry coating pickup percentages are calculated according to the previously discussed calculation method. Table 8 shows the coating composition of Example 1—Coating Composition Primarily Including a Modified Wheat Starch. Table 8 further shows the wet slurry coating percentage pickup, dry coating percentage pickup of the control coating composition, the modified wheat starch at 20% wet batter solids and the modified wheat starch at 35% wet batter solids (WBS) content.

TABLE 8

| Test Sample | Percentage WBS | Dry Wt. of Cereal Pieces | Wet Wt. of Cereal Pieces | Wet Slurry % Pickup | Dry Coating % Pickup |
|---|---|---|---|---|---|
| 1 | 20 | 150 | 191 | 27.3 | 5.5 |
| 2 | 20 | 110 | 149 | 35.5 | 7.1 |
| 3 | 35 | 110 | 150 | 36.4 | 12.7 |
| 4 | 35 | 110 | 179.5 | 63.2 | 22.1 |
| 5 | water only | 110 | 139 | — | — |

Five separate and individual batches of CHEERIOS® were coated with the coating compositions according to the four test samples of Table 8. Each coated batch was then tested to determine its bowl life according to the following procedure.

Approximately 15 grams of coated CHEERIOS® were weighed and placed in a small bowl. About 100 grams of milk (40-45° F.) was added to the small bowl containing the cereal pieces and stirred quickly to wet all the pieces. The cereal was allowed to sit for the allotted time as can be seen in Tables 9-14. The cereal was then drained in a colander. The drained cereal pieces were then weighed.

Tables 10, 11, 13 and 14 show the dry weight of the CHEERIOS® cereal pieces, the drained weight of the wet CHEERIOS® cereal pieces and the weight percentage of milk absorbed by the CHEERIOS® cereal pieces at 1 minute, 3 minutes and 5 minutes. The percentage of milk absorbed was calculated by using the following formula:

$$\frac{(\text{the drained wt. wet cereal pieces (g)} - \text{the dry wt. cereal pieces }(g))}{\text{the dry wt. of the cereal pieces (g).}}$$

Tables 12 and 15 show the average weight percentage of milk absorbed at one minute, three minutes and five minutes. Table 9 is a control group which used uncoated cereal pieces.

TABLE 9

| Control (uncoated) | | | |
|---|---|---|---|
|  | 1 min | 3 min | 5 min |
| Dry weight | 14.95 g | 14.83 g | 15.04 g |
| Drained weight | 33.35 g | 36.68 g | 38.14 g |
| Wt. percentage of milk absorbed | 123.1% | 147.3% | 153.6% |

TABLE 10

| Test Sample 1-Modified Wheat Starch at 20% WBS Content | | | |
|---|---|---|---|
|  | 1 min | 3 min | 5 min |
| Dry weight | 15.09 g | 15.24 g | 15.49 g |
| Drained weight | 28.37 g | 30.58 g | 33.88 g |
| Wt. percentage of milk absorbed | 88.0% | 100.7% | 118.7% |

TABLE 11

Test Sample 2-Modified Wheat Starch at 20% WBS Content

|  | 1 min | 3 min | 5 min |
|---|---|---|---|
| Dry weight | 15.62 g | 15.04 g | 15.23 g |
| Drained weight | 29.03 g | 32.53 g | 33.71 g |
| Wt. percentage of milk absorbed | 85.9% | 116.3% | 121.3% |

The average weight percentage of milk absorbed (from Tables 10-11) at one minute, three minutes, and five minutes when cereal pieces are coated with Modified Wheat Starch at 20% wet batter solids content is shown in Table 12 below.

TABLE 12

|  | 1 min | 3 min | 5 min |
|---|---|---|---|
| Average wt. % milk absorbed | 86.95% | 108.5% | 120% |

TABLE 13

Test Sample 3-Modified Wheat Starch at 35% WBS Content

|  | 1 min | 3 min | 5 min |
|---|---|---|---|
| Dry weight | 15.33 g | 14.86 g | 14.97 g |
| Drained weight | 29.71 g | 31.72 g | 32.71 g |
| Wt. percentage of milk absorbed | 93.8% | 113.5% | 118.5% |

TABLE 14

Test Sample 4 - Modified Wheat Starch at 35% WBS Content

|  | 1 min | 3 min | 5 min |
|---|---|---|---|
| Dry weight | 14.85 g | 15.13 g | 15.25 g |
| Drained weight | 26.29 g | 28.95 g | 30.88 g |
| Wt. percentage of milk absorbed | 77.0% | 91.3% | 102.5% |

The average weight percentage of milk absorbed (from Tables 13-14) at one minute, three minutes, and five minutes when cereal pieces are coated with Modified Wheat Starch at 35% wet batter solids content is shown in Table 15 below.

TABLE 15

|  | 1 min | 3 min | 5 min |
|---|---|---|---|
| Average wt. % milk absorbed | 85.4% | 102.4% | 110.5% |

TABLE 16

Test Sample 5 - Water Only Coating

|  | 1 min | 3 min | 5 min |
|---|---|---|---|
| Dry weight | 15.08 g | 15.17 g | 15.43 g |
| Drained weight | 30.15 g | 34.75 g | 36.51 g |
| Percentage of milk absorbed | 99.9% | 129.1% | 136.6% |

While each modified wheat starch coating composition is suitable for use in the present invention, on average, the cereal pieces with the modified wheat starch coating composition having 35% wet batter solids (WBS) content absorbed less milk over time than the cereal pieces coated with the modified wheat starch having 20% wet batter solids (WBS) content.

Application Process for the Coating Compositions of Examples 7 and 11

The coating compositions of Examples 7 and 11 were respectively applied to the exterior surface of cereal pieces via the following process:
1) Preheat convection to approximately 250° F.;
2) Prepare 500 grams of an aqueous slurry of the respective coating compositions at about 25% solids concentration;
3) Heat to desired temperature using a bench stirrer and a hot plate;
4) Transfer aqueous slurry into a sprayer;
5) Weigh approximately 100 grams of cereal pieces and place then on a perforated metal tray;
6) Spray a light coating of the aqueous slurry onto the cereal pieces;
7) Toss partially coated cereal pieces;
8) Repeat steps 6 and 7 until the desired coverage is attained;
9) Tare a clean perforated tray. Transfer the cereal pieces to this tray;
10) Record the weight of the coated cereal pieces;
11) Place the coated cereal pieces in a convection oven and bake/dry until the added water from the aqueous slurry is removed;
12) Repeat steps 3-11 of all temperatures outlined in Table 15;
13) Allow the samples to cool and then seal in one gallon freezer storage bag; and
14) Evaluate after storage overnight.

TABLE 17

Table 17 below shows the dry weight of approximately 100 grams of CHEERIOS ® cereal pieces, the wet weight of the slurry coated cereal pieces, the weight of the coated cereal pieces after drying, the percentage pickup of the wet slurry by the cereal pieces and the percentage of pickup of the dry coating by the cereal pieces.

| Clear Coat | Slurry temp (° F.) | Dry wt. | Wet wt. | Weight after Drying | Wet % Pickup | Dry % Pickup |
|---|---|---|---|---|---|---|
| Example 11 coating composition | 135° F. | 100.0 | 115.0 | 101.0 | 15.0% | 3.8% |
|  |  | 100.0 | 123.0 | 102.0 | 23.0% | 5.8% |
|  |  | 100.0 | 132.5 | 108.0 | 32.5% | 8.1% |
| Example 11 coating composition | 150° F. | 100.0 | 112.5 | 102.0 | 12.5 | 3.125 |
|  |  | 100.0 | 119.5 | 102.5 | 19.5 | 4.875 |
|  |  | 100.0 | 126.5 | 104.5 | 26.5 | 6.625 |
|  |  | 100.0 | 134.5 | 109.0 | 34.5 | 8.625 |

Separate and individual batches of CHEERIOS® and CHEX® cereal pieces were coated with the coating compositions of Example 7 and 11.

Tables 18-23 show cereal pieces coated with either the coating of Example 7 (Tables 18 and 21) or Example 11 (Tables 19, 20, 22 and 23). Tables 18-20 are CHEX® cereal pieces and Tables 21-23 are CHEERIOS® cereal pieces. The cereal pieces were placed in milk for the time indicated on each respective chart.

Tables 18-23 show the bowl life test results for the coating compositions of Examples 7 and 11. The following tests were given a crispness rating taken from the following numeric scale:

5=very crisp, close to texture of piece straight from the box,
4=crisper than control at 1 minute but not as good as straight from box
3=crispness equal to control product after being in milk for 1 minute
2=some crispness remaining but not as crisp as control after 1 minute
1=little to no crispness

TABLE 18

CHEX ® cereal pieces coated with the
Example 7 coating composition @ 200° F.

| Minutes | Control | Test 1 | Test 2 | Test 3 | Test 4 |
|---|---|---|---|---|---|
| 1 | 5 | 5 | 5 | 5 | 5 |
| 2 | 3 | 5 | 4 | 4 | 4 |
| 3 | 2.5 | 4 | 3 | 3 | 3 |
| 4 | 1 | 3 | 3 | 2 | 3 |
| 5 |  | 1 | 1 | 1 | 2 |
| 6 |  |  |  |  | 2 |
| 7 |  |  |  |  | 1 |

Results:

| Test 1 | Clean and crisp |
|---|---|
| Test 2 | Crisp but slightly tooth-packing |
| Test 3 | Crisp but slightly tooth-packing |
| Test 4 | Crisp at first bite, then slightly tough/chewy and very tooth-packing |

TABLE 19

CHEX ® cereal pieces coated with the
Example 11 coating composition @ 150° F.

| Minutes | Control | Test 1 | Test 2 | Test 3 | Test 4 |
|---|---|---|---|---|---|
| 1 | 5 | 5 | 5 | 5 | 5 |
| 2 | 4 | 4 | 4 | 4 | 4 |
| 3 | 3 | 3 | 3.5 | 4 | 4 |
| 4 | 1 | 2 | 3 | 3 | 3 |
| 5 |  | 1 | 2 | 2 | 3 |
| 6 |  |  | 1.5 | 1.5 | 2 |
| 7 |  |  | 1 | 1 | 1 |

Results:

| Test 1 | Clean and crisp |
|---|---|
| Test 2 | Clean and crisp |
| Test 3 | Crisp but slightly tooth-packing |
| Test 4 | Crunchy, tooth-packing, some blinding and clumping, too |

TABLE 20

CHEX ® cereal pieces coated with the
Example 11 coating composition @ 135° F.

| Minutes | Control | Test 1 | Test 2 | Test 3 | Test 4 |
|---|---|---|---|---|---|
| 1 | 5 | 5 | 5 | 5 | 5 |
| 2 | 3 | 5 | 4 | 4 | 4 |
| 3 | 2.5 | 4 | 3 | 3 | 3 |
| 4 | 1 | 3 | 3 | 2 | 3 |
| 5 |  | 1 | 1 | 1 | 2 |
| 6 |  |  |  |  | 2 |
| 7 |  |  |  |  | 1 |

Results:

| Test 1 | Clean and crisp |
|---|---|
| Test 2 | Clean and crisp |
| Test 3 | Crisp but slightly tooth-packing |
| Test 4 | Crunchy, tooth-packing, some blinding and clumping, too |

Tables 21-23 show CHEERIOS® cereal pieces coated with either the coating of Example 7 or Example 11.

TABLE 21

CHEERIOS ® cereal pieces coated with the
Example 7 coating composition @ 200° F.

| Minutes | Test 1 | Test 2 | Test 3 | Test 4 | Control |
|---|---|---|---|---|---|
| 1 | 5 | 5 | 5 | 5 | 4 |
| 2 | 3 | 4 | 5 | 5 | 3 |
| 3 | 2 | 3.5 | 4 | 5 | 2 |
| 4 | 1 | 3 | 4 | 4 | 2 |
| 5 |  | 3 | 3 | 4 | 1.5 |
| 6 |  | 2 | 3 | 4 | 1 |
| 7 |  | 2 | 2 | 3 |  |
| 8 |  | 1 | 2 | 3 |  |
| 9 |  |  | 1 | 2 |  |
| 10 |  |  |  | 2 |  |
| 11 |  |  |  | 1 |  |

Results:

| Test 1 | Clean and crisp |
|---|---|
| Test 2 | Crisp but slightly tooth-packing |
| Test 3 | Crisp but moderately tooth-packing |
| Test 4 | Somewhat tough and very tooth-packing |

TABLE 22

CHEERIOS ® cereal pieces coated with the
Example 11 coating composition @ 150° F.

| Minutes | Control | Test 1 | Test 2 | Test 3 |
|---|---|---|---|---|
| 1 | 5 | 5 | 5 | 5 |
| 2 | 3 | 5 | 5 | 5 |
| 3 | 2 | 4 | 5 | 5 |
| 4 | 1 | 4 | 4 | 5 |
| 5 |  | 3 | 4 | 4 |
| 6 |  | 3 | 4 | 4 |
| 7 |  | 2.5 | 3 | 3 |
| 8 |  | 1 | 2 | 2.5 |
| 9 |  |  | 2 | 2.5 |
| 10 |  |  | 2 | 2 |
| 11 |  |  | 1 | 1 |

Results:

| | |
|---|---|
| Test 1 | Clean and crisp |
| Test 2 | Crisp but slightly tooth-packing |
| Test 3 | Very crisp but moderately tooth-packing |

TABLE 23

CHEERIOS ® cereal pieces coated with the
Example 11 coating composition @ 135° F.

| Minutes | Control | Test 1 | Test 2 | Test 3 | Test 4 |
|---|---|---|---|---|---|
| 1 | 5 | 5 | 5 | 5 | 5 |
| 2 | 3 | 4 | 5 | 5 | 5 |
| 3 | 2 | 4 | 4 | 5 | 5 |
| 4 | 1 | 3 | 4 | 4 | 4 |
| 5 | | 3 | 3 | 4 | 4 |
| 6 | | 3 | 3 | 4 | 4 |
| 7 | | 2 | 2 | 3 | 3 |
| 8 | | 1.5 | 1.5 | 2 | 2.5 |
| 9 | | 1 | 1 | 2 | 2 |
| 10 | | | | 1 | 1 |

Results:

| | |
|---|---|
| Test 1 | Clean and crisp |
| Test 2 | Crisp but slightly tooth-packing |
| Test 3 | Very crisp but moderately tooth-packing |
| Test 4 | Very crisp but moderately tooth-packing |

As can be seen from the above Tables 18-23, each of the coated cereal pieces exhibited a crisp and/or very crisp texture when exposed up to as many as 10 minutes in liquid. The preferred application level for the coating compositions was approximately 6-7% in a dry solids basis. The coated CHEX® cereal pieces exhibited a bowl life of up to approximately 7 minutes and the coated CHEERIOS® cereal pieces exhibited a bowl life of up to approximately 11 minutes. Both of these are substantially longer bowl life than exhibited by the uncoated cereal pieces.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A food substance, comprising:
a thermally processed cereal piece at least partially coated with a coating composition that is substantially clear after the coated cereal piece has been thermally processed and does not detract from the appearance of the cereal piece compared to an uncoated cereal piece wherein the coating composition comprises a dextrin and a starch component, wherein the coating composition provides enhanced resistance to breakage for the cereal piece such that the at least partially coated cereal piece does not break until enough force is applied to the cereal piece to cause a balance to read greater than 400 grams using the Cereal/Snack Piece Crush Test; and wherein the dextrin has at least about 70% solubility in about 77° F. water and comprises at least about 60% by weight of the coating composition; and wherein the at least partially coated and thermally processed cereal piece absorbs at least about 20% by weight or less milk over a given period of time compared to the milk absorbed by an uncoated cereal piece.

2. The food substance of claim 1, wherein the coating composition consists of a starch component and a dextrin.

3. The food substance of claim 1, wherein the dextrin is chosen from the group consisting of a corn dextrin, a tapioca dextrin, and combinations thereof and the dextrin is a gelatinized dextrin that has been gelatinized by heating.

4. The food substance of claim 2, wherein the starch is chosen from the group consisting of a crosslinked potato starch, an oxidized corn starch, an acetylated potato starch, an acetylated corn starch, an acetylated wheat starch, and combinations thereof.

5. The food substance of claim 1, wherein the coating composition comprises dry particles, the dextrin consists of a tapioca dextrin in dry particle form and the starch component consists of an oxidized corn starch in dry particle form, and wherein the dry particles of the coating composition consist of dry particles having an about U.S. 100 Mesh size or finer commercial size rating.

6. The food substance of claim 2, wherein the dextrin consists of a gelatinized tapioca dextrin and the starch component consists of an oxidized corn starch.

7. The food substance of claim 1, wherein the coating composition consists of dry particles having an about U.S. 100 mesh size or finer commercial size rating.

8. A food substance comprising a thermally processed cereal piece at least partially coated with a clear coating composition that is substantially clear after the coated cereal piece has been thermally processed and does not detract from the appearance of the cereal piece compared to an uncoated cereal piece; wherein the clear coating composition comprises dry components that include a dextrin and a starch component and wherein the clear coating composition provides enhanced resistance to breakage for the cereal piece and wherein the dextrin comprises at least about 60% by weight of the dry components of the clear coating composition and the dextrin has at least 70% solubility in about 77° F. water and wherein the at least partially coated and thermally processed cereal piece absorbs at least about 20% by weight or less milk over a given period of time compared to the milk absorbed by an uncoated cereal piece.

9. The food substance of claim 8, wherein the dextrin is chosen from the group consisting of corn dextrin, tapioca dextrin, and combinations thereof.

10. The food substance of claim 8, wherein the starch is chosen from the group consisting of a crosslinked potato starch, an oxidized corn starch, an acetylated potato starch, an acetylated corn starch, an acetylated wheat starch, and combinations thereof.

11. The food substance of claim 9, wherein the dextrin is a tapioca dextrin that comprises from approximately 80%-100% of the clear coating composition by weight, and wherein the starch is a corn starch that comprises approximately 0.50% of the clear coating composition by weight.

12. The food substance of claim 8, wherein the dextrin is a tapioca dextrin and the starch component is an oxidized corn starch.

13. The food substance of claim 8, wherein the uncoated cereal piece have an original moisture level and the thermally processed cereal pieces have a final moisture level that is substantially the same as the original moisture level of the uncoated cereal piece.

14. The food substance of claim 12, wherein the uncoated cereal piece have an original moisture level and the thermally processed cereal pieces have a final moisture level that is substantially the same as the original moisture level of the uncoated cereal piece.

15. The food substance of claim 14, wherein the dry components of the clear coating composition have about 100 U.S. Mesh size or finer commercial size rating.

16. The food substance of claim 8, wherein the dry components of the clear coating composition have about 100 U.S. Mesh size or finer commercial size rating.

17. A food substance comprising a cereal piece at least partially coated with a clear coating composition that is substantially clear after the coated cereal piece has been thermally processed and does not detract from the appearance of the cereal piece compared to an uncoated cereal piece wherein the clear coating composition comprises dry components that include a dextrin and a starch component wherein the clear coating composition provides enhanced resistance to breakage for the cereal piece and wherein the dextrin comprises at least about 60% by weight of the dry components of the clear coating composition and the dextrin has at least 70% solubility in about 77° F. water and wherein the dry particles of the clear coating composition have an about 100 U.S. mesh size or finer commercial size rating.

18. The food substance of claim 17, wherein the clear coating composition is applied as an external coating to the cereal piece, and the clear coating composition comprises tapioca dextrin in the amount of at least about 60% by weight of the dry components of the clear coating composition, and a modified corn starch wherein the modification consists of oxidation such that the modified corn starch is an oxidized corn starch.

19. The food substance of claim 17, wherein the clear coating composition consists of tapioca dextrin in an amount of at least about 60% by weight of the dry components of the clear coating composition and an oxidized corn starch.

20. The food substance of claim 17, wherein the thermally processed, coated cereal piece does not break until enough force is applied to the cereal piece to cause a balance to read greater than 400 grams using the Cereal/Snack Piece Crush Test.

* * * * *

UNITED STATES PATENT AND TRADEMARK OFFICE
CERTIFICATE OF CORRECTION

| | | |
|---|---|---|
| PATENT NO. | : 8,043,643 B1 | |
| APPLICATION NO. | : 11/932765 | |
| DATED | : October 25, 2011 | |
| INVENTOR(S) | : Cheree L. B. Stevens et al. | |

It is certified that error appears in the above-identified patent and that said Letters Patent is hereby corrected as shown below:

Col. 1, line 17;
   "Now" should be -- now --.

Col. 3, line 32;
   "as a small" should be -- as small --.

Col. 3, line 44;
   "they tend" should be -- dextrins tend --.

Col. 6, line 6;
   "sweeteners(s)" should be -- sweetener(s) --.

Col. 7, line 45;
   "the wheat, starch" should be -- the wheat starch --.

Col. 10, line 63;
   "primarily" should be -- primary --.

Col. 12, line 30;
   "an modified" should be -- a modified --.

Col. 13, lines 4-6;
   "Coating compositions employing modified high amylose corn starch as the primary component."
Should be -- Coating compositions may employ modified high amylose corn starch as the primary component. --.

Col. 13, lines 41-42;
   "techniques some" should be -- techniques by which some --.

Signed and Sealed this
Tenth Day of April, 2012

David J. Kappos
*Director of the United States Patent and Trademark Office*

CERTIFICATE OF CORRECTION (continued)
U.S. Pat. No. 8,043,643 B1

Col. 15, line 61;
    "shatters" should be -- shatter --.

Col. 16, line 30;
    "effect" should be -- affect --.

Col. 17, line 27;
    "Crust" should be -- Crush --.

Col. 20, line 19;
    "then" should be -- them --.

Col. 20, line 57;
    "Example" should be -- Examples --.

Col. 21, line 53;
    "blinding" should be -- binding --.

Col. 22, line 19;
    "blinding" should be -- binding --.

Col. 24, claim 7, line 28;
    "mesh" should be -- Mesh --.

Col. 24, claim 13, line 62;
    "have" should be -- has --.

Col. 24, claim 14, line 67;
    "have" should be -- has --.

Col. 26, claim 17, line 2;
    "mesh" should be -- Mesh --.